US007446077B2

(12) United States Patent
Ramirez-Corredores et al.

(10) Patent No.: US 7,446,077 B2
(45) Date of Patent: Nov. 4, 2008

(54) SELECTIVE SULFUR REMOVAL FROM HYDROCARBON STREAMS BY ABSORPTION

(75) Inventors: M. M. Ramirez-Corredores, Miranda (VE); Zaida Hernandez, Miranda (VE); Julia Guerra, Miranda (VE); Raul V. Navarro, Miranda (VE)

(73) Assignee: Intevep, S.A., Caracas (VE)

( * ) Notice: Subject to any disclaimer, the term of this patent is extended or adjusted under 35 U.S.C. 154(b) by 862 days.

(21) Appl. No.: 10/803,519

(22) Filed: Mar. 17, 2004

(65) Prior Publication Data

US 2005/0205470 A1 Sep. 22, 2005

(51) Int. Cl.
*B01J 20/00* (2006.01)
(52) U.S. Cl. ..................................................... 502/400

(58) Field of Classification Search ................. 502/400, 502/439
See application file for complete search history.

(56) References Cited

U.S. PATENT DOCUMENTS 4,684,530 A * 8/1987 Welsh et al. ............. 426/330.4

* cited by examiner

*Primary Examiner*—Edward M. Johnson
(74) *Attorney, Agent, or Firm*—Bachman & LaPointe, P.C.

(57) ABSTRACT

An adsorbent for selective removal of sulfur from a hydrocarbon feedstock includes a matrix material having a surface area of at least about 400 $m^2/g$ and a surface acidity of less than about 0.20 $\mu mol/m^2$; and a metal phase dispersed through the matrix, the metal phase being selective to reversible adsorption of sulfur. A process for using and method for making the adsorbent are also provided.

14 Claims, 3 Drawing Sheets

GD= Gas desorption; LD1= Liquid desorption Vl/Va = 6
TD= Temperature Desorption; LD2= Liquid desorption Vl/Va < 6

SELECTIVE SULFUR REMOVAL FROM HYDROCARBON STREAMS BY ABSORPTION

BACKGROUND OF THE INVENTION

This invention relates to an adsorbent for the selective removal of organic sulfur compounds from hydrocarbon feedstocks, to a method for making the adsorbent, and to a process for using the adsorbent in producing a relatively sulfur free liquid hydrocarbon fuel.

Organic sulfur compounds are present in most gas and liquid refinery streams. $H_2S$ is the main moiety in gas streams. Mercaptans, organic sulfides, and disulfides are present in the liquid fractions obtained from the refining of crude oils like distillation naphtha and virgin cuts. Thiophenes, alkyl-thiophenes, benzothiophenes, and the like are produced by cracking of these organic sulfur compounds in processes such as thermal or catalytic cracking.

Due to environmental regulations, the amount of sulfur present in fuels has to be minimized. Besides, some downstream refining processes impose severe sulfur specifications in order to avoid catalyst deactivation. In both cases, refiners must accomplish reductions above 95% of the original feedstock sulfur.

Regardless of blending cases, in general, FCC naphtha, thermal cracking naphthas or reformate are the main components of final gasolines. Cracked naphtha represents 30 to 40 vol % of the gasoline blends. The rest of the gasoline components are butanes, alkylate, reformate, isomerizate, oxygenates, and coker naphthas in lower proportions. The sulfur concentration is lower than 20 wt ppm in the alkylate, while it is less than 1 wt ppm in the reformate or isomerizate. Therefore, it is the catalytic naphtha which is the main responsible component for the sulfur content in gasoline.

The potential use of fuel cells and on board reforming vehicles for year 2005 and beyond stresses the needs for fuels with sulfur specifications lower than 5 wt ppm. These new technologies are considering the installation of cartridges capable of sulfur removal ahead of the reformer or the fuel cell. A nonstop long-term tendency leads towards the production of ultra-low sulfur fuels.

Sulfur removal from liquid streams by adsorption or absorption methods are interesting due to their selective potentialities. So far, the available hydrotreatment technologies have limited performance with feedstocks which have octane number sensitivity to hydrogenation, such as cracked naphthas, due to their olefin and aromatic contents. On the other hand, those technologies affect the hydrogen balance in the refinery. Emergent technologies based on biodesulfurization, liquid extraction, oxidation and ultrasound are currently under development and their application is not conventional for the refiners.

It is therefore the primary object of the present invention to provide a sulfur selective adsorbent, which is not rapidly deactivated during use, even in the presence of mono olefins, dienes and aromatic compounds in the liquid hydrocarbon streams.

It is a further object of the invention to provide a process for removing sulfur compounds using a sulfur selective adsorbent.

It is a still further object of the invention to provide a method for making a sulfur selective adsorbent.

Other objects and advantages will appear hereinbelow.

SUMMARY OF THE INVENTION

In accordance with the present invention, the foregoing objects and advantages have been readily attained.

According to the invention, an adsorbent for selective removal of sulfur from a hydrocarbon feedstock is provided which comprises a matrix material having a surface area of at least about 400 $m^2/g$ and a surface acidity of less than about 0.20 $\mu mol/m^2$, and a metal phase dispersed through said matrix, said metal phase being selective to reversible adsorption of sulfur.

In further accordance with the invention, a process for removing sulfur compounds from a liquid hydrocarbon is provided, which comprises the steps of providing a hydrocarbon feedstock containing sulfur; providing an adsorbent comprising a matrix material having a surface area of at least about 400 $m^2/g$ and a surface acidity of less than about 0.20 $\mu mol/m^2$, and a metal phase dispersed through said matrix, said metal phase being selective to reversible adsorption of sulfur; and exposing said feedstock to said adsorbent under sulfur adsorption conditions whereby sulfur from said feedstock is adsorbed by said adsorbent.

In further accordance with the invention, a method for making a sulfur selective adsorbent is provided which method comprises the steps of providing a matrix material; forming said matrix material to provide shaped adsorbent elements; and contacting said elements with a transition metal solution so as to disperse said metal through said matrix and provide said adsorbent.

BRIEF DESCRIPTION OF THE DRAWING

A detailed description of preferred embodiments of the present invention follows, with reference to the attached drawings, wherein.

DETAILED DESCRIPTION

Figure 1:
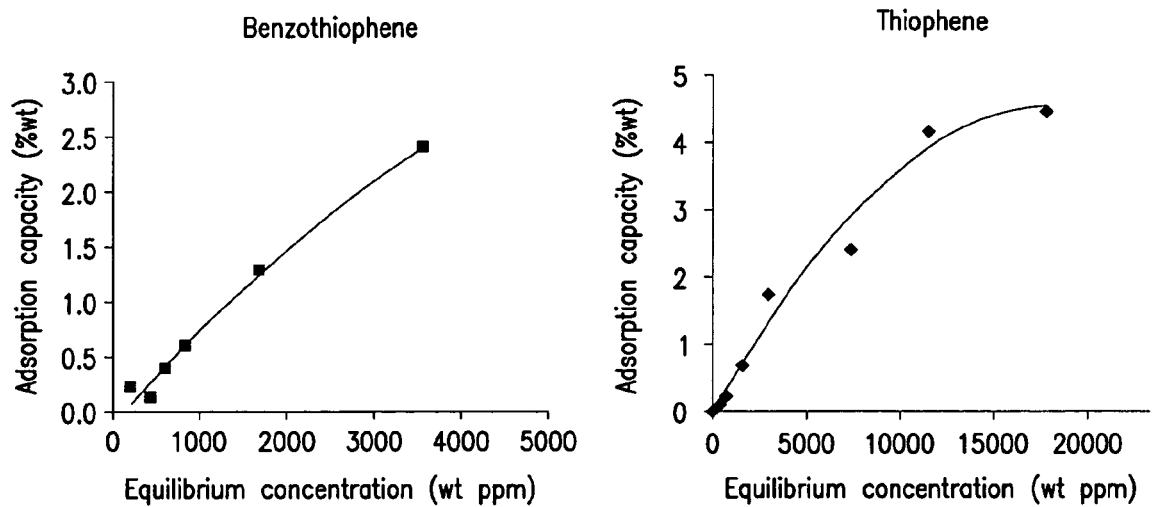
FIG. 1 illustrates adsorption capacity versus equilibrium concentration for benzothiophene and thiophene.

The invention relates to an adsorbent for selectively removing sulfur from a hydrocarbon feedstock. It also relates to a method for preparing the sulfur selective adsorbent. Furthermore, it discloses a process which uses the adsorbent for treating a hydrocarbon feedstock in order to remove organic sulfur compounds contained therein. Finally, an adsorption/desorption process is disclosed wherein adsorbent according to the invention is advantageously used and then regenerated for subsequent use, in a continuous manner.

According to the invention, a sulfur selective adsorbent is provided which comprises a high surface area material wherein the material is modified by the presence of highly dispersed metals. The high surface area material is preferably mixed with a binder and extruded or otherwise formed into a desired shape for use in hydrocarbon contacting processes. The metal is selected so as to exhibit a high affinity for organic sulfur compounds but in a reversible way, under given conditions. The resulting adsorbent is preferably formulated so as to provide a high activity toward the adsorption of sulfur, and a low activity toward polymerization of olefins and dienes. This combination of properties according to the invention provides the adsorbent with an advantageous and desirable selectivity toward the adsorption of organic sulfur compounds when contacted with a sulfur containing feedstock, with a reduced tendency toward polymerization of unsaturated compounds which can result in fouling of the adsorbent. Furthermore, the activity of the adsorbent toward selective adsorption of sulfur is thereby protected from rapid deactivation during use.

The adsorbent exhibits a surface area of at least about 400 $m^2/g$, preferably between about 400 to about 1200 $m^2/g$, more preferably between about 600 to about 1000 $m^2/g$, and has an overall surface acidity of less than or equal to about 0.2 $\mu mol/m^2$, preferably less than about 0.05 $\mu mol/m^2$, when measured as the amount of irreversibly adsorbed pyridine at 100° C.

According to the invention, a high surface area matrix material is provided which is preferably selected from the group consisting of siliceous oxide materials, alumina, molecular sieves, structurally ordered materials, and mixtures thereof. The matrix is advantageously treated in accordance with the invention so as to reduce the surface acidity of the matrix substantially to nil, and to provide a very high surface area.

The matrix is then extruded or accordingly molded, by using a binder selected so as not to compromise the substantially nil surface acidity, so as to provide shaped elements.

The shaped adsorbent matrix or elements are preferably dried, for example overnight at a temperature of between about 80 and about 250° C., and then calcined, preferably at a temperature of between about 400 and about 700° C., so as to provide the shaped matrix according to the present invention.

The shaped matrix is then contacted with a transition metal solution. Contact can take place by adsorption, impregnation, grafting or any other known conventional way of metal deposition on high surface area materials. The metal is selected so as to strongly interact with the surface species of the matrix and to result in highly dispersed, very small metal particles after impregnation. Preferably, these particles have a particle size of less than or equal to about 10 nm.

The metal source and impregnation conditions are also selected to provide such highly dispersed, very small final metal particles on the matrix surface. Furthermore, the active metal is, in accordance to the present invention, selected as to provide a very high electron attraction, or electrophilysity, so as to interact with sulfur compounds present in the hydrocarbon feedstock, causing their surface adsorption.

In order to render the adsorption to be reversible, the metal is chosen or accordingly transformed into a d5 or d10 electron configuration. It is believed that metals with oxidation states of d5 or d10 electron configuration are capable of reversibly interacting with electron donors such as heteroatomic compounds. Suitable active metals, holding suitable oxidation states, include most of the transition metals of the first, second and third row, and from Groups IB, IIB, VIIB and VIII, of the Periodic Table of Elements. Particularly preferred metals include those of Group VIII of the Periodic Table of Elements. The metal source is chosen so as to provide the suitable oxidation state either with no treatment or by a moderate treatment avoiding reduction conditions or any hydrogen treatment.

The shaped metal impregnated adsorbent is preferably dried, for example overnight at a temperature of between about 80 and about 250° C., and then calcined, preferably at a temperature of between about 400 and about 700° C., so as to provide the final adsorbent product according to the present invention.

The described method for preparing the adsorbent product according to this invention has been found to provide an adsorbent material having a desirably low surface acidity. This acidity is preferably less than or equal to about 0.20 $\mu mol/m^2$, preferably less than or equal to about 0.05 $\mu mol/m^2$, as measured by the amount of irreversibly adsorbed pyridine on the surface of the adsorbent. This low surface acidity has been found according to this invention to be particularly advantageous in providing an adsorbent having a low activity toward polymerization of the reactive molecules present in the hydrocarbon feedstock, protecting the adsorbent from deactivation.

Thus, the metal phase provides the desired selectivity toward sulfur adsorption, while the matrix is chosen so as to avoid deactivation. This combination of properties according to this invention provides the adsorbent with an advantageous and desirable selectivity toward the adsorption of sulfur compounds when contacted with a sulfur containing feedstock, with a reduced tendency toward polymerization of dienes, which can result in fouling of the adsorbent. As a whole, the adsorbent according to the present invention has an excellent selectivity, reversibility and longevity for use in selectively removing sulfur contaminants from feedstocks containing relatively large fractions of contaminant molecules and of reactive unsaturated compounds.

The adsorbent material according to the invention is especially useful in treating hydrocarbon liquid feedstock containing up to about 4000 ppm of sulfur, preferably between about 3 and about 1000 ppm as sulfur, regardless of the unsaturated compound concentration of the feedstock. A particularly desirable feedstock is an FCC cracked naphtha, jet fuel or diesel, which contains sulfur, regardless of the presence of olefins, aromatics and diene components. The adsorbent material according to the invention has been found to have excellent selectivity and longevity toward the removal of sulfur from such feedstock.

The adsorbent product of the present invention may be used in a hydrocarbon contacting process as follows. A sulfur containing hydrocarbon feedstock and an adsorbent according to the invention are provided, as set forth above.

The feedstock and adsorbent are preferably contacted according to the invention in suitable treatment facilities, and under moderate sulfur removal conditions, most preferably at a temperature of less than or equal to about 300° C., and a pressure of less than or equal to about 500 psi, preferably less than or equal to about 300 psi. The adsorbent according to the invention has been found to be capable of adsorption of at least 90% wt of the sulfur contaminant of a feedstock containing in excess of about 1.4 wt % dienes over a treatment period during which about 100 volumes of feedstock are treated per volume of adsorbent. Thus, the adsorbent according to the present invention has an excellent selectivity and longevity for use in selectively removing sulfur contaminants from feedstock containing relatively large fractions of sulfur and reactive compounds.

After a particular period of use, for example after processing at least about 100 volumes of feedstock, it is desirable according to the invention to regenerate the adsorbent through a process whereby adsorbed sulfur and other contaminant molecules are removed from the adsorbent so as to provide a renewed adsorbent for further use as discussed above. According to the invention, adsorbed contaminants are removed using a suitable desorbent stream, which acts as a displacement fluid and serves to enhance the longevity of the adsorbent material.

Conventionally, desorption can be accomplished in four different ways: 1) "Thermal swing" involves heating the bed to a temperature in which the adsorptive capacity is reduced to a low level so that the sorbate leaves the adsorbent surface and is easily remove by the stream of purge gas; 2) "Pressure swing" similarly depends on reducing adsorptive capacity by lowering the pressure at essentially constant temperature; 3) "Inert purge stripping" removes the adsorbate, without changing temperature or pressure, by passage of a fluid (gas or liquid) containing non-adsorbable molecules, and in which the adsorbate is soluble or miscible; and 4) "Displacement desorption" does not involve changing the temperature or pressure, but depends on passage of a fluid containing a high concentration of an adsorbable molecule or a more strongly adsorbable molecule. Because of this high concentration, this molecule is able to displace material previously adsorbed by mass action.

Due to the nature of the contaminants present in the treated feedstock, displacement is preferred within the scope of the present invention since inert purge stripping or displacement can be carried out in liquid phase operations at substantially constant temperature and/or pressure conditions. Selection of the desorbent fluid depends on refinery availability. Two selection criteria are used within the embodiment of the present invention. For the first criterion, displacement with a strongly sorbed fluid material is desirable because the displacement of sorbed contaminants is rapidly achieved. However, care must be taken to remove the displacement material itself before again using the adsorbent in process conditions so as to avoid damage to the adsorbent. On the other hand, use of a displacing material which is less strongly sorbed requires additional steps such as purge gas stripping and the like which are undesirable. In the second criterion, a solvent with high solubility capabilities for sulfur compounds and with a clear-cut difference in boiling points between them might be chosen. The sorbed sulfur compounds are removed from the adsorbent by solubility and separated the desorbent fluid by a flash distillation.

According to the invention, after the adsorbent material has been used sufficiently to have appreciable build up of adsorbed contaminants such as sulfur compounds, dienes, other unsaturated compounds and the like, the adsorbent is contacted with a displacing stream or desorbent under moderate desorption conditions so as to displace the adsorbed contaminant molecules. Suitable desorbents include $C_1$-$C_{16}$ olefins free hydrocarbons. Preferred desorbents include paraffins, aromatics, alcohols, ethers, ketones, and mixtures thereof. Particularly preferred desorbents include $C_1$-$C_{10}$ paraffinic hydrocarbon. The desorbent is preferably contacted with a used adsorbent at desorption conditions including moderate temperature, preferably less than or equal to about 300° C., and moderate pressure, preferably less than or equal to about 300 psig. According to the invention, this desorbent advantageously is capable of excellent displacement of adsorbed contaminants, but can itself be removed with a following flushing step as set forth below.

Before contacting with the desorbent, it may be desirable to purge the adsorbent with a flushing stream so as to remove any non-adsorbed feedstock material such as hydrocarbon and the like. The flushing stream may preferably be a stream which is inert with respect to the adsorbent, for example another hydrocarbon, which is suitable for removing any remaining fluid. It should readily be appreciated that the foregoing application provides an advantageous process for regenerating used adsorbent according to the invention using desorbent streams, which are effective at displacing contaminant molecules, and is itself removable from the adsorbent.

It should also be appreciated that further treatment of the adsorbent may be desired in some cases, such as filtration, fractionation, and the like. These optional additional steps are well known in the art.

EXAMPLE 1

This example illustrates the measurement of surface acidity of the adsorbent in accordance with the invention. The surface acidity is measured as the amount of irreversibly adsorbed pyridine on samples of the relevant materials. The samples were subjected to calcination at various temperatures between about 400° C. and about 800° C. A sample of about 10-20 mg is loaded onto the bucket of a micro-electrobalance and fully outgassed. Then, it is subjected to pyridine vapor at 30° C. up to saturation. A helium flow is used for outgassing at various temperatures (30, 100 and 200° C.). The amount of irreversibly adsorbed pyridine at each temperature is measured as $\mu$mol of pyridine per $m^2$ of adsorbent sample. The amount measured at 30, 100 and 200° C. is taken as Weak, Medium and Strong Acidity, respectively.

Three Fe (III)-containing samples, supported onto different materials were considered. A siliceous mesoporous matrix, alumina and silica were used as support of the Fe-containing adsorbents. As shown in Table 1, the adsorbent according to the invention (Fe-Matrix) substantially exhibits weak acidity, which is also the case for the silica-supported sample. However, the Fe-alumina material clearly showed more than 30% of medium-strong acid sites.

TABLE 1

| | Acidity by pyridine adsorption | | |
|---|---|---|---|
| BET Surface | | $\mu mol_{py}/m^2$ | |
| Area ($m^2g^{-1}$) | Weak | Medium | Strong |

| | | | | |
|---|---|---|---|---|
| Fe-Matrix | 790 | 1.65 | 0.05 | 0 |
| Fe-Alumina | 172 | 0.60 | 0.24 | 0.10 |
| Fe-Silica | 323 | 0.50 | 0.03 | 0 |

EXAMPLE 2

This example illustrates the measurement of surface metal dispersion of samples of the relevant materials in accordance with the invention. The surface metal dispersion is measured as the surface metal atom concentration per surface atom concentration of the support material. Surface atom concentrations are measured by X-Ray Photoelectron Spectroscopy (XPS) in a duly calibrated LHS-11 equipment. The respective samples were outgassed in a high vacuum chamber, up to a vacuum better than $10^{-8}$ torrs. Table 2 shows the results, which can be taken as an indirect measurement of the metal particle size, the larger the dispersion, the smaller the particle size.

TABLE 2

Surface metal dispersion (Sup = Si or Al)

| | [Fe]$_{at}$/[Sup$_{at}$] |
|---|---|
| Fe-Matrix | 135 |
| Fe-Alumina | 73 |
| Fe-Silica | 64 |

Thus, the smallest metal particles can be found on the surface of the adsorbent in accordance with the invention. Meanwhile, the larger metal particles were found on the surface of the silica-supported sample.

EXAMPLE 3

This example illustrates the adsorption of thiophene and benzothiophene from test heptane solutions using the adsorbent according to this invention. The adsorbent was prepared according to this invention, and having 9.4 wt % of iron. FIG. 1 illustrates the adsorption isotherms for the various test solutions. As shown, in both cases the adsorbent effected significant reductions in sulfur for various loadings of the test solution. Further, the way of incorporating the metal, did not significantly affect the adsorption of sulfur.

EXAMPLE 4

Figure 2:
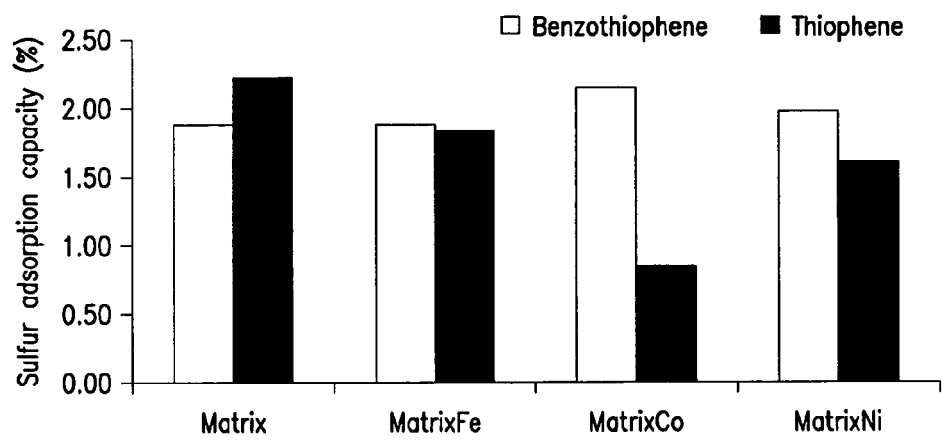
FIG. 2 illustrates results obtained in accordance with the present invention utilizing different metals in removal of benzothiophene and thiophene.

This example illustrates the adsorption of thiophene and benzothiophene from test solutions using three adsorbents according to the invention. The adsorbents were prepared according to the invention using different metals Fe, Co, Ni, and having 9.4, 11.4 and 12.6 wt % of metal content. The samples were placed in contact with test solutions containing 3400 wt ppm of sulfur in heptane, and were allowed to reach equilibrium. Upon reaching equilibrium, the solutions were analyzed using RXF and the amount of adsorbed sulfur was determined. FIG. 2 illustrates the sulfur removal obtained with the adsorbents expressed as percentage of sulfur removed per mass unit of adsorbent. As shown in FIG. 2, selectivity can be controlled by metal selection.

EXAMPLE 5

Figure 3:
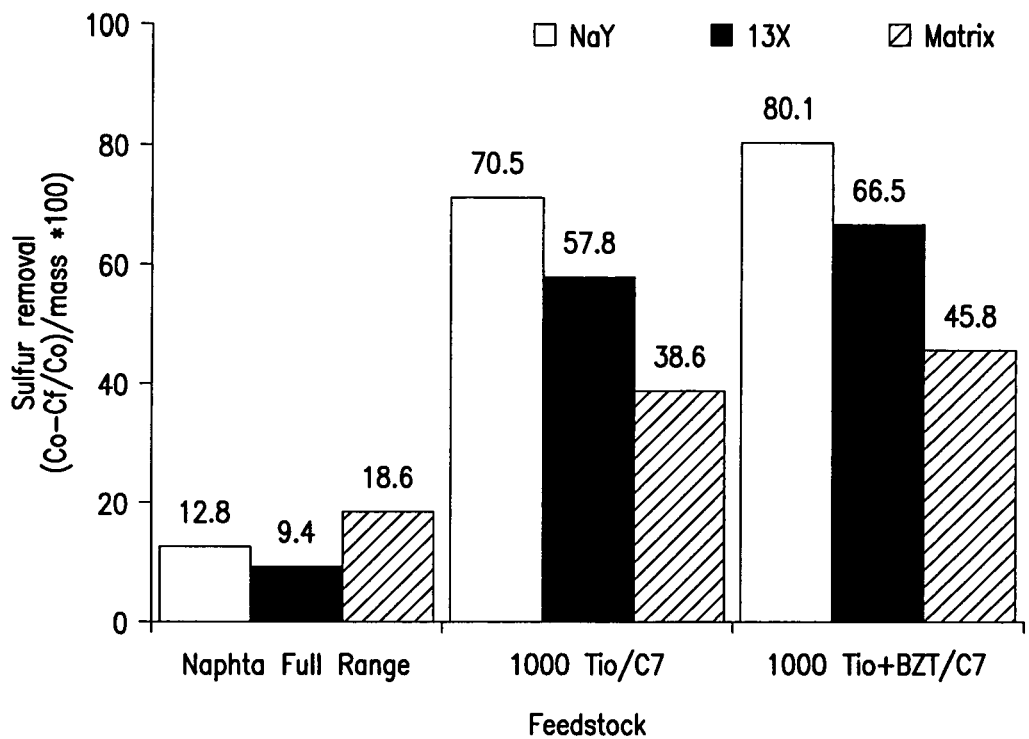
FIG. 3 illustrates results obtained using conventional removal of sulfur and also using the adsorbent in the accordance with the present invention.

This example compares the sulfur adsorption for the adsorbent according to this invention with adsorbents from prior art. Prior art adsorbents are based on NaY and 13× zeolites. The samples were placed in contact with different test heptane solutions containing 1000 wt ppm of sulfur using thiophene as probe molecule, 1000 wt ppm of sulfur using a mixture thiophene and benzothiophene (BZT) in 1:1 molar ratio and a typical full range cracked naphtha. Table 2 shows the full range naphtha composition used in the test. Upon reaching equilibrium, the solutions were analyzed using RXF and the amount of adsorbed sulfur was determined. FIG. 3 illustrates the sulfur removal obtained for each adsorbent expressed as percentage of sulfur removed per unit of adsorbent mass. As shown in FIG. 3, the adsorbents exhibited a very good sulfur adsorption capacity when a paraffin was the solvent. However, in the presence of complex mixtures of aromatics, olefins and naphthenes contained in the naphtha, the adsorption capacity is considerably reduced. The matrix of the adsorbent according to the invention shows the lowest loss of adsorption capacity and the highest removal capacity from real feedstocks.

TABLE 2

| Full Range Naphtha Composition (% wt) | |
|---|---|
| Naphthenes | 32.2 |
| Paraffins | 24.0 |
| I-paraffins | 34.3 |
| Aromatic | 3.0 |
| Olefins | 6.0 |
| $C_{13}^+$ | 0.2 |
| Total | 00.0 |
| Sulfur, wt ppm | 1480 |

EXAMPLE 6

This example compares the sulfur adsorption for the adsorbent according to the invention using different sulfur content feedstock. The samples were placed in contact with different test solutions containing 286 wt ppm and 3530 wt ppm of sulfur, respectively. The feedstocks used in this examples consist of cracked naphthas, differing in their high olefins (ORCN: olefin-rich cracked naphtha) and/or aromatics content (ARCN: aromatic-rich cracked naphtha). Table 3 shows the naphthas composition used in the test. Upon reaching equilibrium, the solutions were analyzed using RXF and the amount of adsorbed sulfur was determined.

TABLE 3

| Naphthas Composition (% wt) | | |
|---|---|---|
| | ORCN | ARCN |
| Naphthenes | 13.7 | 3.6 |
| Paraffins | 5.1 | 2.2 |
| I-paraffins | 35.6 | 6.7 |
| Aromatic | 4.3 | 73.2 |
| Olefins | 41.0 | 1.3 |
| $C_{13}^+$ | 0.3 | 13.0 |
| Total | 100.0 | 100.0 |
| Sulfur, wt ppm | 286 | 3530 |

Figure 4:
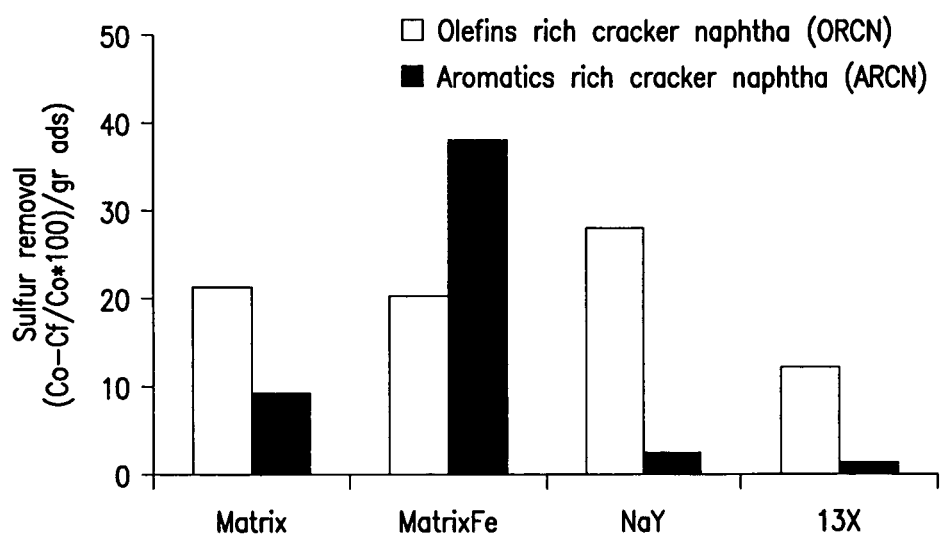
FIG. 4 illustrates sulfur removal obtained using the composition of the present invention as compared to other materials.

FIG. 4 illustrates the sulfur removal obtained expressed as percentage of sulfur removed per unit of adsorbent mass. As shown in FIG. 4, the adsorbents (Matrix and Fe-Matrix) show a very good sulfur adsorption capacity with both olefin and aromatic rich feedstocks. For aromatic-rich cracked naphtha, the presence of the metal Fe increases the capacity of adsorption to double the capacity of adsorption obtained for the matrix.

EXAMPLE 7

This example confirms the selective adsorption of sulfur with two different adsorbents according to the present invention. The adsorbent consisted of finely dispersed Fe(III) particles onto high surface area, non-acid supports. The supports consisted of the previously mentioned siliceous mesoporous matrix and an activated carbon (Filtrasorb, from Calgon Carbon Corp.). The adsorbent samples were evaluated using a LCC naphtha from a FCC unit as feedstock. The feedstock contained 1.4 wt % dienes, and 175 ppmv of sulfur. The feedstock composition is shown in Table 5 below. The adsorption conditions were 50 psig, 25° C., LHSV of 1 h$^{-1}$ and process time of 3 hours. A flushing stage was then carried out using a nitrogen stream for purging, pentane for displacement and nitrogen for flushing after the displacement. The desorption was carried out at a pressure of 50 psig. and a temperature of 25° C., as it described in Example 6. The adsorption capacity for the first two adsorption-desorption cycles are collected together with the adsorbent characteristics, in Table 6.

TABLE 5

LCC naphtha composition (wt %)

| | Feedstock |
|---|---|
| Naphthenes | 13.2 |
| Error! Bookmark not defined.Paraffins | 4.9 |
| I-paraffins | 34.4 |
| Aromatic | 4.2 |
| Olefins | 43.3 |
| Diolefins | 1.4 |
| Total | 100.0 |

TABLE 6

Adsorption Capacity (*100/g$_{adsorbent}$)

| | 1$^{st}$ Cycle | 2$^{nd}$ Cycle |
|---|---|---|
| Matrix | 0.00 | — |
| Fe-Matrix | 4.1 | 3.7 |
| Carbon | 2.4 | — |
| Fe—Carbon | 3.3 | 3.7 |

In the absence of Fe, the base support material did not show reversibility towards sulfur compound adsorption. It is clear that adsorbents prepared accordingly to the present invention show good capacity and the required reversibility for a low severity operation.

EXAMPLE 8

This example illustrates the selective adsorption of sulfur with several different adsorbents. Several adsorbent samples were prepared and evaluated using feedstock ORCN as described in Example 5. The samples tested contained 3 wt % Fe in a siliceous mesoporous matrix, in NaY zeolite, in alumina, and in silicagel. Table 7 presents the properties of these different materials. A 100 cc adsorber was loaded with 50 cc of the adsorbent sample.

TABLE 7

Properties of 3 wt % Fe materials

| Adsorbent | Surface area BET m$^2$/g | Pore volume cc/g | Pore size Å | Metal content wt % |
|---|---|---|---|---|
| Fe-Matrix | 789.85 | 0.54 | 25.60 | 2.2 |
| Fe—NaY | 587.91 | 0.35 | 24.30 | 3.1 |
| Fe-Alumina | 171.75 | 0.41 | 68.40 | 2.3 |
| Fe-Silicagel | 322.67 | 0.82 | 75.64 | 2.5 |

Figure 5:
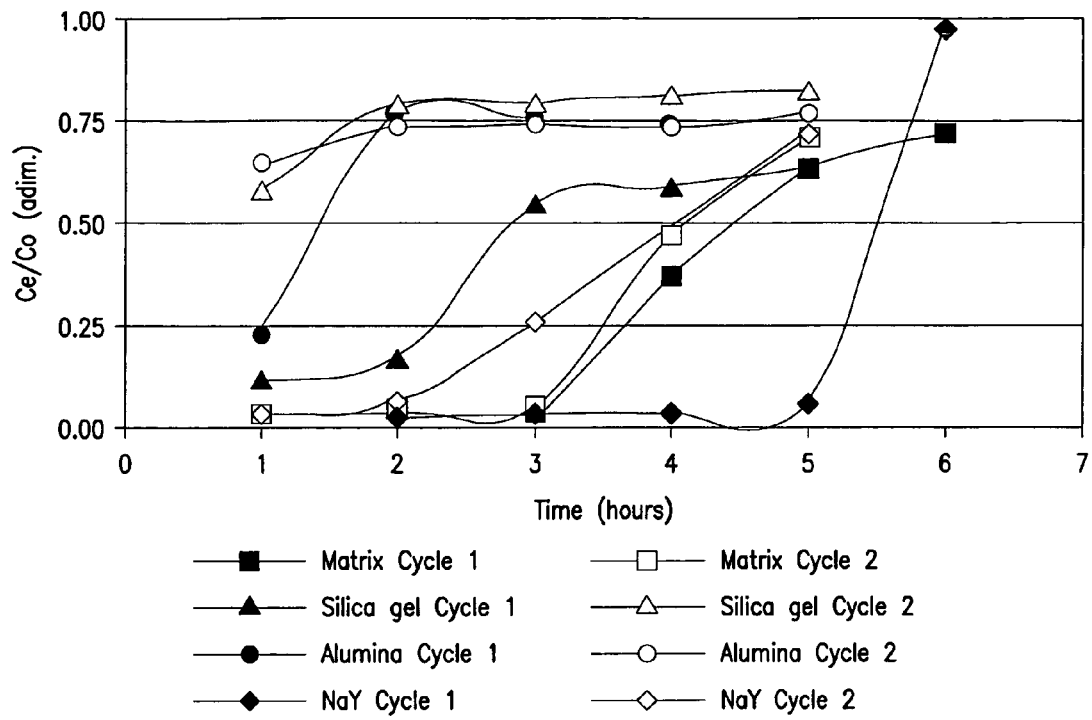
FIG. 5 illustrates reversibility in terms of sulfur removal for the composition in accordance with the present invention and for other compositions.

The feedstock initially contained 1.4% dienes and 286 wt ppm sulfur as set forth in Table 4 below. The adsorption conditions were 50 psig of pressure, 25° C., sulfur content of 286 ppmv, LHSV of 1 h$^{-1}$ and process running time of 3 h. A desorption stage was then carried out using a C5 stream as desorbent stream, and nitrogen for flushing before the displacement. The desorption was carried out at a pressure of 50 psig, and a temperature of 25° C. During the flushing stage, 30 volumes of nitrogen, measured at room conditions, per adsorbent volume were used for a period of 1 h, followed by displacement using 6 volumes of pentane per adsorbent volume at an LHSV of 2 h$^{-1}$ for a period of 3 h. The results are set forth in FIG. 5.

As can be seen, reversibility can only be achieved by using the adsorbent of the present invention, which meets the requirements on surface acidity and dispersion all together.

EXAMPLE 9

A 100 cc adsorber was loaded with 50 cc of an adsorbent according to the present invention having a 2.2 wt % Fe in a siliceous mesoporous matrix. An LCC naphtha from a FCC unit was used as feedstock, which composition is shown in Table 8 below.

TABLE 8

LCC naphtha composition (wt %)

| | Feedstock | Product |
|---|---|---|
| Naphthenes | 13.2 | 13.9 |
| Paraffins | 4.9 | 4.3 |
| I-paraffins | 34.4 | 33.4 |
| Aromatic | 4.2 | 4.8 |
| Olefins | 43.3 | 42.3 |
| Diolefins | 1.4 | 1.3 |

Figure 6:
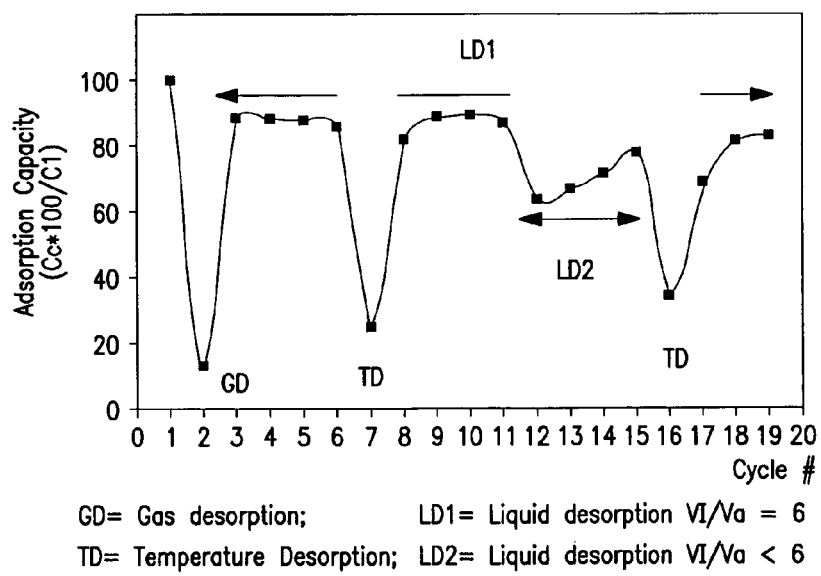
FIG. 6 illustrates the adsorption capacity of an adsorbent following regeneration and use in a series of cycles.

The adsorption conditions were 50 psig, 25° C., LHSV of 1 h$^{-1}$ and process time of 3 hours. A flushing stage was then carried out using a nitrogen stream for purging, pentane for displacement and nitrogen for flushing after the displacement. The desorption was carried out at a pressure of 50 psig. and a temperature of 25° C., as it described in Example 6. The results are set forth in FIG. 6 and Table 6. Table 9 resumes a comparison between the sulfur compounds contents in the feedstock and in the adsorption product.

TABLE 9

LCC naphtha sulfur composition (ppmv)

| Compound. ppmv | Feedstock | Product |
|---|---|---|
| Dimethylsulfide | 0.1748 | 0 |
| Isopropylmercaptan | 0.0816 | 0 |
| Thiophene | 113.2016 | 3.2843 |
| Nbutilmercaptan | 0.1985 | 0.0307 |
| Methyl-thiophene | 43.3621 | 2.2877 |
| Ethyl-thiophene | 0.7664 | 0 |
| Ethyl-disulfide | 0.541 | 0 |
| Propyl-thiophene | 1.7721 | 0.158 |
| Dibutyl-sufide | 2.1805 | 0 |
| Butyl-thiophene | 9.2695 | 1.2204 |
| Benzothiophene | 2.0423 | 0 |
| Methyl-benzothiophenes | 1.2161 | 0.1851 |
| Total | 174.8065 | 7.1662 |

As can be seen, reversibility and so operability and longevity can only be achieved by using the adsorbent of the present invention. The adsorption process yields a product with less than 10 ppm sulfur content.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An adsorbent for selective removal of sulfur from a hydrocarbon feedstock, comprising:
   a matrix material having a surface area of at least about 400 $m^2/g$ and a surface acidity of less than about 0.20 $\mu mol/m^2$; and
   a metal phase dispersed through said matrix, said metal phase being selective to reversible adsorption of sulfur.

2. The adsorbent of claim 1, wherein said matrix material has surface acidity of less than about 0.05 $\mu mol/m^2$.

3. The adsorbent of claim 1, wherein said matrix material has a surface area of between 400 $m^2/g$ and about 1200 $m^2/g$.

4. The adsorbent of claim 1, wherein said matrix material has a surface area of between about 600 $m^2/g$ and about 1000 $m^2/g$.

5. The adsorbent of claim 1, wherein said metal phase is present at a surface atomic concentration ratio of between about 80 and about 500.

6. The adsorbent of claim 1, wherein said matrix is selected from the group consisting of siliceous oxides, alumina, molecular sieves, structurally ordered materials and combinations thereof.

7. The adsorbent of claim 1, wherein said matrix is siliceous oxide.

8. The adsorbent of claim 1, further comprising a binder disposed through said matrix.

9. The adsorbent of claim 1, wherein said metal phase pomprises a metal having one of a d5 and d10 electron configuration.

10. The adsorbent of claim 1, wherein said metal phase is selected from Group IB, IIB, VII B and VIII of the periodic table of elements, and combinations thereof.

11. The adsorbent of claim 1, wherein said metal phase is a Group VIII metal.

12. The adsorbent of claim 1, wherein said metal phase is present at a surface of said matrix material as particles having a particle size of less than or equal to about 10 nm.

13. A method for preparing an adsorbent for selective removal of sulfur from a hydrocarbon stream, comprising the steps of:
   providing a matrix material;
   forming said matrix material to form shaped adsorbent elements; and
   contacting said elements with a transition metal solution so as to disperse said metal through said matrix and provide said adsorbent.

14. The method of claim 13, wherein said adsorbent has a surface area of at least about 400 $m^2/g$ and a surface acidity or less than about 0.20 $\mu mol/m^2$.

* * * * *